United States Patent [19]
Albertelli

[11] Patent Number: 6,093,356
[45] Date of Patent: *Jul. 25, 2000

[54] FORMING MOULDING WITH SIMULATED WOOD GRAIN SURFACE

[75] Inventor: Aldino Albertelli, London, United Kingdom

[73] Assignee: Acell Holdings Limited, Guernsey, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/637,751

[22] PCT Filed: Nov. 3, 1994

[86] PCT No.: PCT/GB94/02419

§ 371 Date: Jul. 15, 1996

§ 102(e) Date: Jul. 15, 1996

[87] PCT Pub. No.: WO95/12496

PCT Pub. Date: May 11, 1995

[30] Foreign Application Priority Data

Nov. 3, 1993 [GB] United Kingdom .................. 9322626

[51] Int. Cl.[7] .............................. B29C 33/42; B29C 59/02
[52] U.S. Cl. ............................ 264/247; 264/255; 264/293
[58] Field of Search ...................................... 264/255, 293, 264/294, 132, 245, 246, 247, 254

[56] References Cited

U.S. PATENT DOCUMENTS

| | | |
|---|---|---|
| 3,247,047 | 4/1966 | Buckley . |
| 3,561,103 | 2/1971 | Dent . |
| 3,729,368 | 4/1973 | Ingham et al. ........................... 264/245 |
| 4,092,198 | 5/1978 | Scher et al. .............................. 264/132 |
| 4,367,110 | 1/1983 | Oshikawa ................................. 264/293 |
| 4,396,448 | 8/1983 | Ohta et al. ............................... 264/293 |
| 4,871,588 | 10/1989 | Cuddy et al. . |
| 5,075,059 | 12/1991 | Green ...................................... 264/129 |
| 5,565,263 | 10/1996 | Ohsumi et al. ....................... 264/328.1 |

FOREIGN PATENT DOCUMENTS

| | | |
|---|---|---|
| 2063178 | 6/1981 | United Kingdom . |
| 9218341 | 10/1992 | WIPO . |

*Primary Examiner*—Angela Ortiz
*Attorney, Agent, or Firm*—Hodgson, Russ, Andrews, Woods & Goodyear LLP

[57] ABSTRACT

Synthetic resin mouldings such as panels and doors having an improved simulated wood grain finish are obtained by first coating a part of all of the mold surface with at least one colorant having a color which is different from the color of the resin cured and then wiping the mold surface. This has the unexpected effect of concentrating the colorant on the peaks and high points of the moulding and thus in the valleys of the resultant moulding.

5 Claims, 1 Drawing Sheet

FORMING MOULDING WITH SIMULATED WOOD GRAIN SURFACE

This invention relates to the production of synthetic resin mouldings having a simulated wood grain surface.

It is known that products such as panels, doors, door frames, window frames, artificial wooden beams, etc., can be produced with a moulded synthetic resin surface to which a simulated wood grain finish has been applied by effecting contact, usually with pressure, between a surface of a fluid body of curable synthetic resin, e.g. polyester resin, and a mould surface designed to impress the simulated wood grain effect on said resin surf ace. The curable resin is then normally maintained in contact with the mould surface until it has been cured to the state where the fine detail of the impressed finish is not lost or significantly undesirably impaired when the moulding is parted from the mould.

The desired surface of the mould may be obtained, for example, by forming the mould against a suitable wooden surface. The effect may be enhanced by causing the wooden surface to swell, e.g. by soaking it, prior to its use as the former.

The wood grain-like finish on the synthetic resin moulding may be further improved by suitable pigmentation of the resin and/or by surface treatment.

While the method is widely used and very good results may be obtained, there is still room for improvement in the quality of finish. Furthermore, the finishes currently obtained normally require at least two further treatments, namely, staining and varnishing, in order to obtain a quality product, and these add significantly to the cost, especially since often more than one staining step is required. Moreover, the product recovered from the mould cannot be sanded because every scratch is highlighted in any subsequent staining treatment.

It has been proposed e.g. in FR-A-2469263 and WO92/18341 to achieve a further improvement in the simulated wood grain effect achieved by this procedure by coating the surface of the mould with a colourant such as a pigment or dye, so that when the curable resin is applied against the surface of the mould, the colourant transfers to the surface of the resin and is retained thereon when the cured resin moulding is subsequently parted from the mould.

To achieve a wood grain effect that simulates as nearly as possible its natural equivalent, it is desirable for the colourant to accumulate in the valleys of the moulding. This means that the colourant must be concentrated on the peaks of the mould from which the moulding is obtained. However, in the method employed in FR-A-2469263, the colourant tends to be concentrated in the valleys of the mould and while WO92/18341 suggests restricting the coating to the higher areas of the mould, the procedures described therein for the purpose, namely application of the colourant with a stiff pad or use of a carbon paper or coloured transfer paper, have serious drawbacks in practice because they do not lend themselves to automation, are labour-intensive, require a skilled labour force and/or require the use of expensive materials.

This problem is solved by the process of the present invention which involves first applying the colourant over the mould surface and thereafter wiping the surface. Contrary to what would be expected from such a procedure, it has been found that this has the effect of concentrating the residual colourant on the peaks of the mould surface. This is particularly surprising in view of the disclosure in WO92/18341 which teaches that wiping a mould surface on which a colourant has been deposited removes the colourant from the high points of the surface.

Not only is the colourant concentrated on the peaks of the mould surface, and thus in the valleys of the resultant moulding, but it has been found that a greater depth of colourant is found on the higher peaks, thus automatically providing a very desirable gradation of colour tone in the valleys of moulding obtained from the moulds, with the deeper valleys having a deeper tone of colour, as in a natural wood product.

The first step of the process involves applying the colourant over the mould surface. The preferred method involve applying it to the whole, or substantially the whole, surface. A light coating is adequate.

The colourant, e.g. pigment or dye, may be applied as a dry powder or as a suspension or solution in a suitable liquid medium which may be aqueous or non-aqueous; e.g. an ink. Where a pigment is employed in suspension in a liquid medium the latter may suitably include a binder. Application may be by any suitable method such as spraying, doctor knife coating, brushing, using a cloth, etc. and as the whole or substantially the whole area of the mould surface may be coated with the colourant, this coating step is readily automatable. It is not essential for the whole surface to be coated or-for the coating to be uniform but if it is desired not to coat chosen areas of the mould surface, they can be protected by masking.

The second step of the process involves wiping the coated surface of the mould. Where the colourant has been applied dry, e.g. as a powder, no intermediate treatment is required but where it has been applied in combination with a liquid, e.g. as a solution or dispersion, the coated mould surface should first be dried.

The surface should be wiped in a manner as if to remove colourant deposited in the first step; however, the manner of wiping does not appear to be critical and any suitable method and material may be employed provided that the surface of the mould is not defaced or damaged. For example, the wiping may be by means of soft bristle, sponge, cloth or other suitable material. The wiping step, like the coating step, is readily adaptable to automation, e.g. by advancing the coated mould surface under a brush, sponge or cloth rotating about an axis parallel to the plane of the mould surface, Any part of the mould surface not to be subjected to the wiping may be protected by masking.

Contrary to expectations, the wiping step has the effect of concentrating colourant on the high points or peaks of the mould surface, relative to other areas. While the perceived concentration may be apparent, in that it is the result, at least in part, of selective removal of colourant from other areas by the wiping, redistribution of the colourant over the surface of the mould during the wiping step may also be a contributory factor. In any event, the result is that colourant becomes selectively concentrated on the high points and peaks and moreover, the local concentration of colourant increases with the height of the peak or high point. While the colourant is concentrated on the peaks and high areas, this is not to say that the remaining areas are free of colourant; indeed for some finishes, it may be desirable to leave at least traces of colourant on other areas of the surface. The method of wiping and pressure applied during wiping may be adjusted by trial and error to achieve the desired effect.

If desired more than one colourant may be applied before the wiping step and the colourants may be deposited on different areas of the mould surface or the second colourant may at least partly overlay the first. In the latter case, the wiping step will selectively concentrate the second colourant, where it overlays the first, on the high points and peaks.

Likewise, the step of applying the colourant and then wiping the mould surface may be repeated, if desired, using different colourants. By this means two or more colourants may be applied and a wide variety of wood surfaces may be simulated. Further variation may be achieved, if desired, by selective removal of colourant from the resultant moulding, e.g. by sanding the high points.

The desired moulding is obtained by bringing a fluid body of curable synthetic resin into contact with the mould surface, preferably with applied pressure, causing or allowing the resin to cure and harden while in contact with the mould surface and then parting the resultant moulding from the mould. If desired the fluid body of curable resin may comprise a layer supported by a backing, e.g. a rigid board or a surface of cured resin. By this means the colourant on the mould surface is transferred to the moulding and since the colourant is concentrated on the high points and peaks of the mould, it will be concentrated in the valleys of the moulding. Moreover, as the deeper valleys will have the higher concentrations of colourant, a gradation of colour which is remarkably similar to that found in the surface of natural wood, is achieved. Furthermore, because the curable resin is in the fluid state when it is contacted with the mould surface, significant quantities of the colourant may be incorporated into the body of the resin as well as on the surface, thereby providing a finish which is more resistant to damage.

The effect achieved by the process of the invention varies with the kind of wood grain surface simulated by the mould, the colour of the dye or pigment and the colour of the resin and the best results for any particular combination require trial and experiment. In general, however, it is desirable for the colour of the resin and the colour of the dye or pigment to provide a good contrast, in particular a contrast similar to that which exists in real wood, e.g. as in a dark coloured, e.g. black, pigment or dye in the deeper grained areas of the moulding and a paler base colour for the resin which is similar to that of the desired wood effect.

In general, a mould release agent will be applied to the surface of the mould prior to application of the colourant.

The invention is now described in greater detail with reference to one embodiment thereof and with the aid of the accompanying drawings, wherein FIG. 1 shows, in diagrammatic and much enlarged form, a section of a part of a mould intended to produce a moulding with a simulated wood grain effect;

Figure 1:
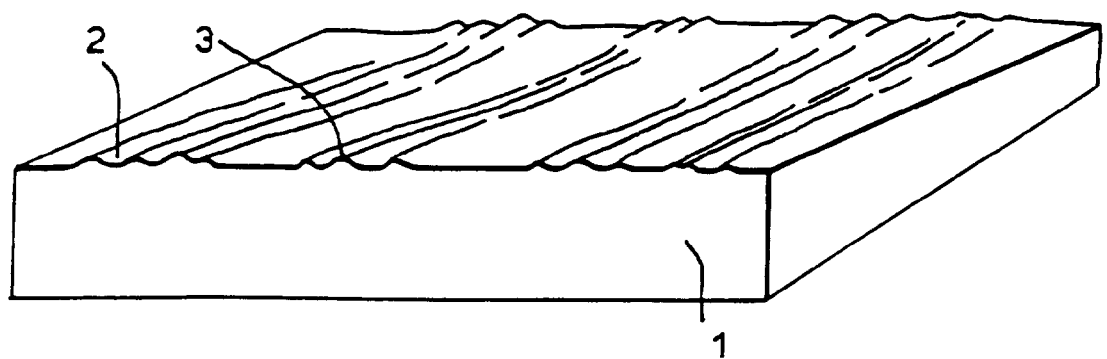

Referring to FIG. 1, 1 is a mould having a surface with valleys 2 and peaks 3 and formed to impart a simulated wood grain finish to a synthetic resin moulding. The mould may be obtained by casting a suitable mould-forming material, e.g. polyester, polyurethane elastomer or silicone rubber, against the surface of a sheet of wood in which preferably the surface grain has been exaggerated by previously soaking the surface of the wood in water to cause it to swell.

Figure 2:
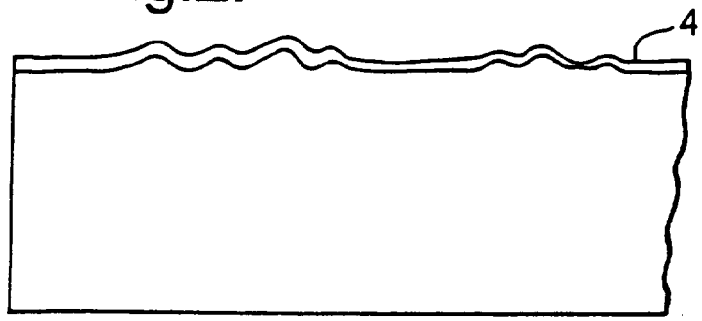
FIG. 2 shows in cross-section the surface of the mould of FIG. 1 after application of colourant in accordance with the first step of the invention.

As illustrated in FIG. 2, in a first step, a colourant is applied to the surface of the mould 1 to form a coating 4.

Figure 3:
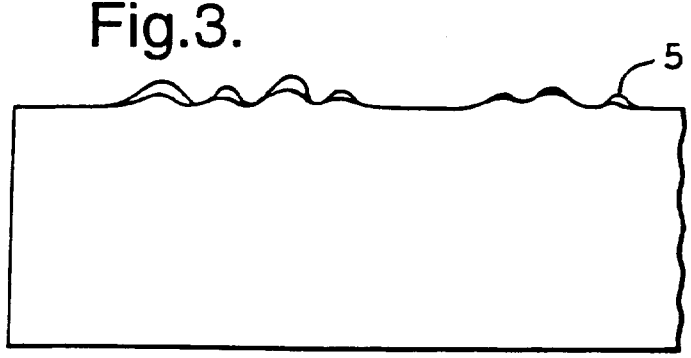
FIG. 3 shows in cross-section the surface of the mould of FIG. 1 after completion of the second step of the invention.

In a second step, the coated surface is wiped by any of the methods described above such that a residue 5 of the coating is concentrated on the high points or peaks of the mould surface as illustrated in FIG. 3.

Figure 4:
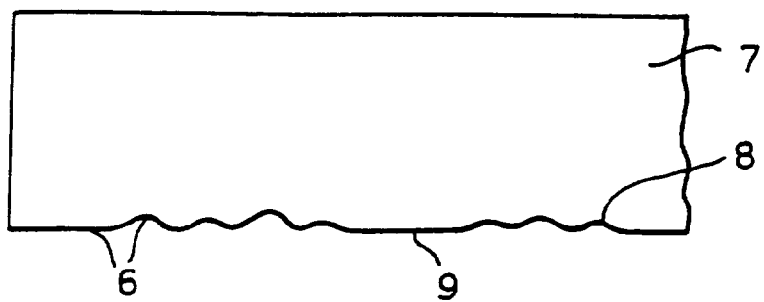
FIG. 4 shows in cross-section the surface of a moulding obtained from the mould of FIG. 3.

After completion of the second step, a layer of curable synthetic resin, e.g. polyester, having a colour which is a contrast to the pigment in the residue 5, is applied to the mould surface preferably with the application of pressure to ensure good contact, and is allowed to remain in contact with the mould surface until cure of the resin is substantially complete. By means of the contact of the resin with the mould surface, the pigment is transferred to the resin surface 6, producing the moulding 7 illustrated in FIG. 4. The moulding 7 comprises a resin layer principally the valley areas of which are coated or impregnated with pigment. The high areas or peaks 9 of the moulding 7 are the colour of the resin.

As will be well understood by those skilled in the art, the resin layer may be the external layer of a complex moulding which may, for example, include further backing layers of resin at least one of which may include filler and/or fibrous reinforcement. The moulding having the resin layer as an outer face may also include one or more preforms such as of blocks of wood or rigid plastics foam which are located behind and bonded to the resin layer or layers.

The process of the invention provides a simple and readily automatable way of obtaining a simulated wood moulding wherein the colourant is associated with the grain, as in natural wood.

The wood grain effect on the surface of the moulding of the invention is closer to the real thing than that produced by the processes of the prior art where the pigment tends to be concentrated in the valleys of the mould and hence on the peaks of the moulding. Moreover, the product of the invention does not require staining prior to varnishing, and may not require varnishing.

Further, by means of the invention, many colours and/or shades of colour can be achieved in the panel and where the pigment or dye is incorporated into the resin layer the result is more resistant to damage from everyday use than a conventional stain finish.

Yet a further advantage of the invention is that the need for staining is avoided although the product may be stained if desired.

Another advantage is that the product more readily accepts stains and varnishes. This is believed to be due to the presence on or in the resin surface of pigment particles which enhance the ability of the surface to absorb the stain or varnish.

Further improvement may be achieved by sanding or otherwise abrading the surface prior to staining or varnishing. Moreover, contrary to what is found with resin mouldings with simulated wood-grain surfaces and without the pigmentation provided by the process of the present invention, sanding does not mar the finish. In fact, it can enhance the finish in some cases, e.g. where it is employed to remove any pigment or dye from the high points of mouldings.

While the invention has been described with reference to forming the simulated wood grain surface in resin it will be understood that it is also applicable to any other mouldable settable material such as gypsum plaster or a thermoplastics material employed in the heat-softened state.

I claim:

1. A process for the formation of a product with a moulded face having a simulated wood grain finish by effecting contact between a surface of a mouldable body of settable material and a mould surface designed to impress a simulated wood grain effect on the surface of the body and wherein the mould surface has a coating of colorant, in the form of a pigment or dye, having a colour which is different from a colour of the settable material when cured and said colorant is transferred to the surface of the body of settable material when said contact is effected and retained on the surface of the body when the body is parted from the mould, characterized in that the coating is provided by applying colorant to the surface of the mould and thereafter wiping the surface of the mould whereby to cause concentration of colorant on high points and peaks of the mould surface, the colorant being dry before said step of wiping, so that when said colorant is transferred to the surface of the body of settable material said colorant is concentrated in troughs formed in the body of settable material by the mould surface.

2. A process as claimed in claim 1 wherein the settable material comprises curable synthetic resin.

3. A process as claimed in claim 1 or claim 2 wherein the steps of applying colourant to the mould surface and wiping the surface of the mold are repeated.

4. A process as claimed in claim 1, claim 2 or claim 3 wherein the mould surface is treated with mould release agent prior to applying the colourant.

5. A process as claimed in claim 1 wherein colorant in liquid form is applied to the surface of the mould which then is dried prior to said step of wiping the surface of the mold.

* * * * *